Aug. 2, 1932.  B. BRANDA  1,869,658
MACHINE FOR CRACKING AND SORTING NUTS
Filed Sept. 13, 1930  3 Sheets-Sheet 1

INVENTOR
Baptistin BRANDA
By Chatwin Company
attys.

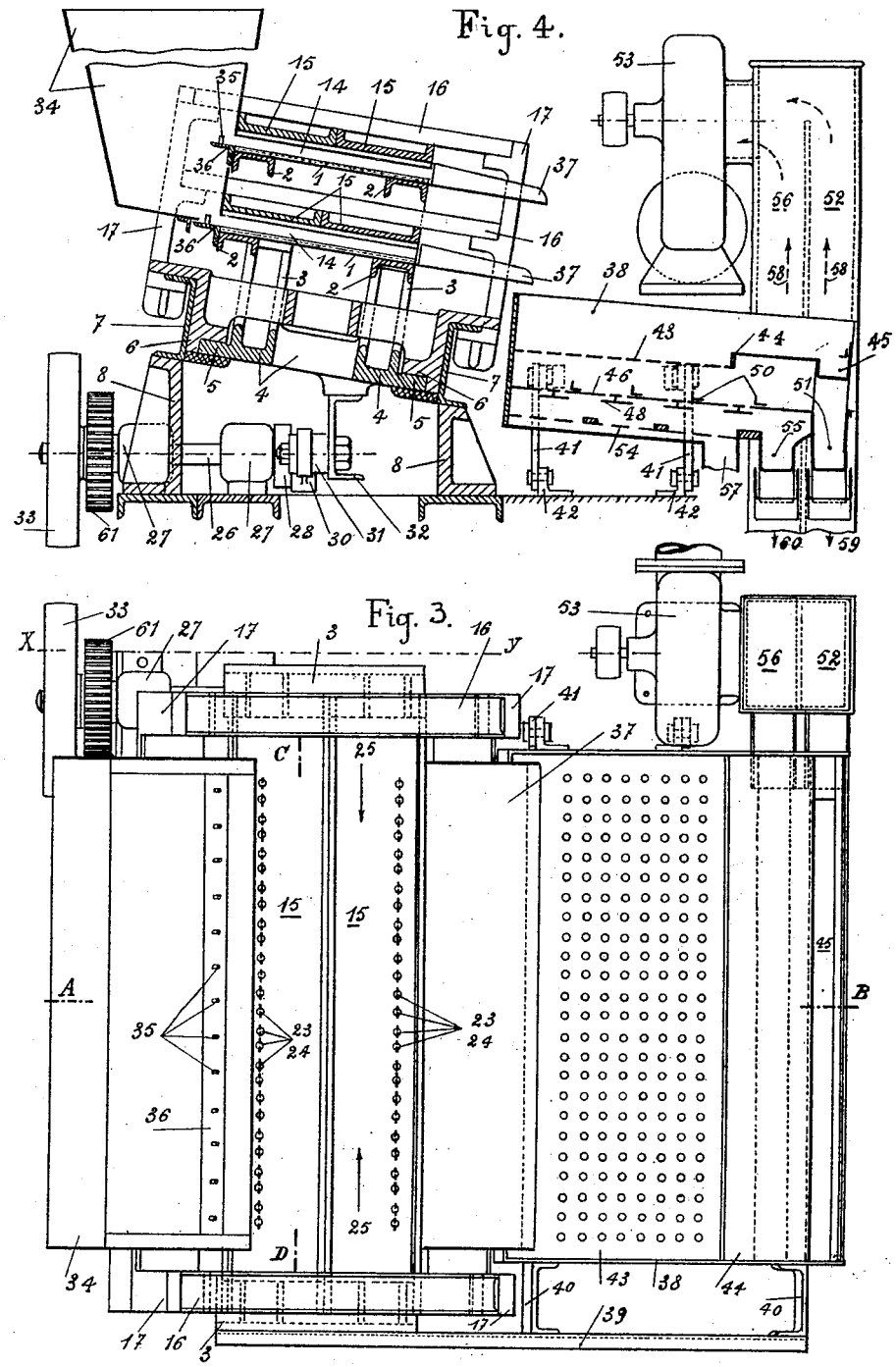

INVENTOR
Baptistin BRANDA
By: Chatwin & Company
attys.

Patented Aug. 2, 1932

1,869,658

UNITED STATES PATENT OFFICE

BAPTISTIN BRANDA, OF MARSEILLE, FRANCE

MACHINE FOR CRACKING AND SORTING NUTS

Application filed September 13, 1930, Serial No. 481,793, and in France March 3, 1930.

The present invention has for its object the production of a machine for cracking nuts, particularly monkey nuts as received in bulk with a percentage of damaged kernels equivalent to what would occur by hand cracking of the shells. This machine which has a large output completes the cracking operation by separating the nuts from the shells and is arranged so that it can be easily mounted if necessary on a transportable device so that it can be drawn or taken from place to place where it is to be employed.

Machines hitherto in use for cracking monkey nuts and the like and carried out on known principles such as: beaters, grinders, cylinders, and so on give a large percentage of broken nuts. These broken nuts render it very difficult to separate the kernels from the shells and cause a loss which is all the greater as the fragments of kernel become greater. On the other hand, if the presence of the broken kernels is not a major inconvenience in the case of an immediate utilization of the product it is not the same when the product from the machine has to be dispatched long distances away. In this case the acidity to which the broken parts are subject causes an appreciable loss.

The machine according to the present invention comprises two distinct parts: the cracking part and the sorting part, but wherein the integral interest results from their combination.

Figure 1:
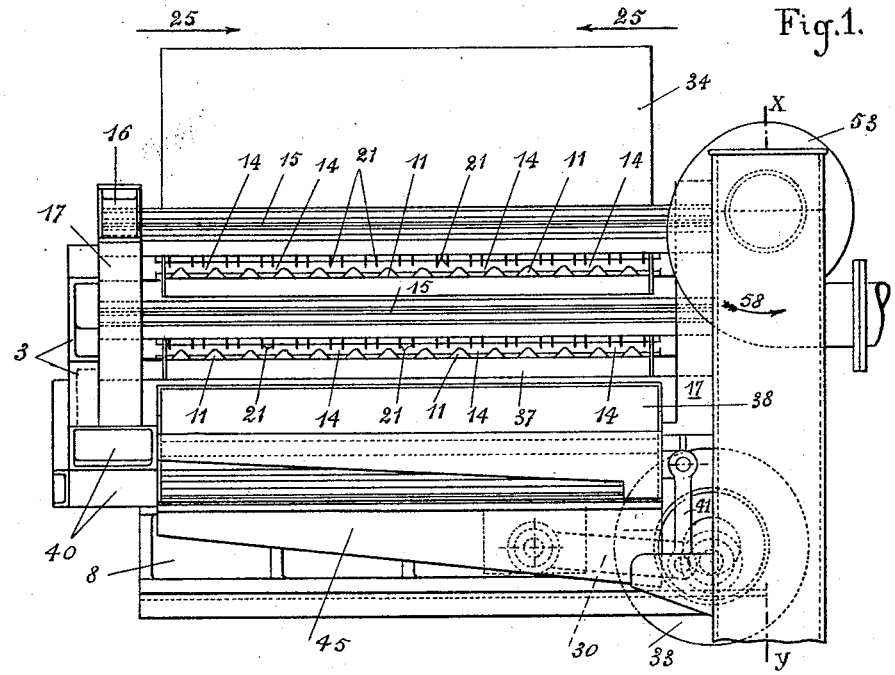
Figure 2:
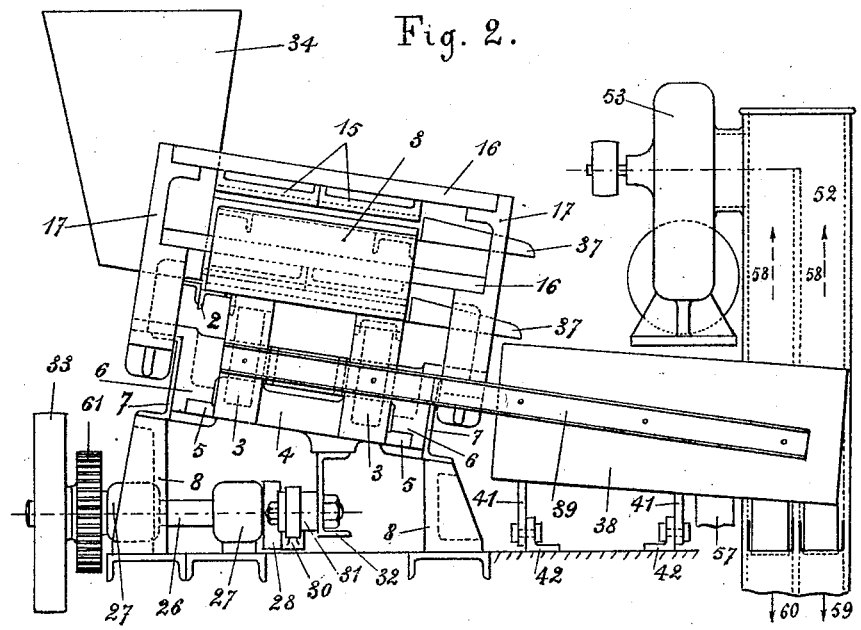
Figure 5:
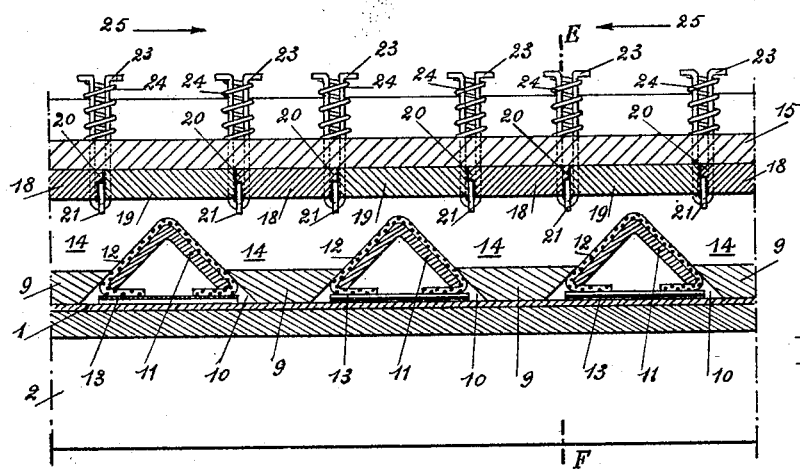
Figure 6:
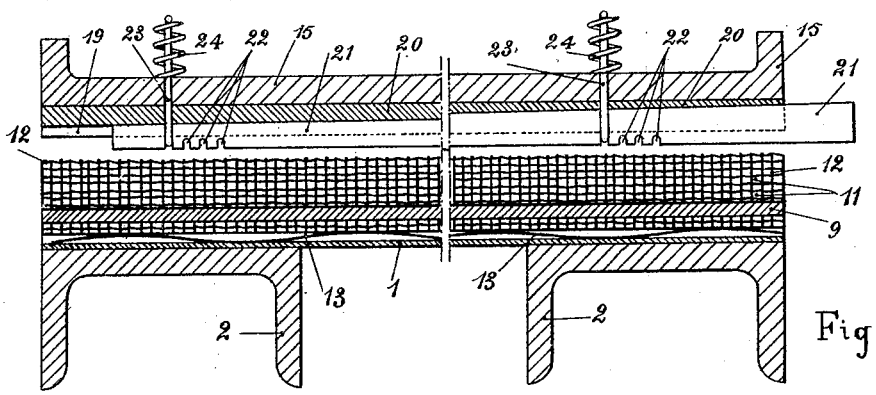
Figure 8:
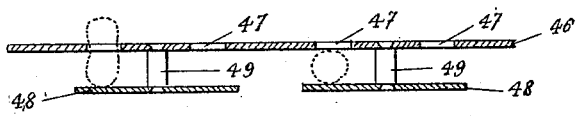
Figure 7:
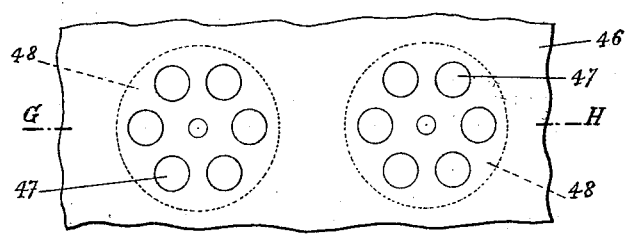

In order to show a practical construction without limitation of the mechanical details of construction which can be modified in the best interest of the strength of the machine and of its general form, the principle remaining the same, the accompanying drawings show by way of example:

Fig. 1 a front elevation of the complete machine; Fig. 2 a side view corresponding to Fig. 1; Fig. 3 a plan view corresponding to Fig. 1; Fig. 4 a section on the line A—B of Fig. 3; Fig. 5 a detail view to larger scale taken in section on the line C—D of Fig. 3; Fig. 6 a section taken on the line E—F of Fig. 5; Fig. 7 a plan view showing to a larger scale the details of the second sieve; Fig. 8 a section taken on the line G—H of Fig. 7.

In its details the machine comprises:

1. *Cracking.*—The cracking device comprises one or several platforms consisting of sheet iron 1 and U-irons 2 mounted by means of cross members 3 on a chariot 4 sliding easily by means of slides 5 in slideways 6 secured on a cradle 7 held inclined to the horizontal plane by supports of different height marked 8.

On the platforms 1 (Figs. 5-6) are secured a series of small steel rods 9 leaving between them small dovetail channels 10 in which are fitted angle plates 11 covered with pointed metal sheeting 12 such as that used in flour or rice mills. Bands of undulated or corrugated steel 13, slid subsequently beneath the angle plates 11 press the latter and the pointed steel 12 firmly in their housings 10 while at the same time allowing of an easy dismantling. From this assembly there results that the platform 1 forms above it a series of channels 14 of trapezoidal section with the sides inclined at 135 degrees in relation to the small bases of the trapezes thus formed, constituted by the upper planes of the small rods 9.

Above each platform 1 parallel thereto and independent thereof is provided a fixed and independent thereof is provided a fixed platform formed by U-irons 15 (Figs. 1, 2, 3, 4) secured to cross members 16 held by supports 17 secured to the slideways 6 and to the cradle 7. Each platform comprises a series of quadrangular rods 18—19 (Figs. 5, 6) secured immovably and leaving between them small spaces obtained by means of conical heel pieces 20, cut in the rods 18, with their least height at the front of the machine and their maximum height at the rear. In the spaces left by the heels 20, slide knives 21 of hardened steel and of quadrangular section conical over their width, the application of these conical parts against those of the heel pieces 20 ensuring the parallelism of the free surfaces of the knives with the lower plane of the rods 18, 19. These knives 21 have a series of notches 22 into which penetrate the hook ends 23 which hooks pass through the holes provided in the stationary platform 15 and ensure the holding of the knives by means of return springs 24. By pressing on the top of the hooks 23 and thereby on the springs 24 the knives 21 are freed and by longitudinal displacement of the latter in their housings, the relief of the internal faces can be increased by passing to the next notches. This increase is provided by 5/100 mm. for each notch. On the other hand, this manner of fixing permits of the easy and rapid renewal of used knives.

The chariot 4 and thence the platforms 1 and their assembly, are given alternative movement indicated by the arrows 25, which is of small amplitude and generally obtained by a shaft 26 turning in bearings 27 and having at one end a handle 28 which actuates the chariot 4 through the intermediary of a connecting rod 30 articulated on a shaft 31 secured to an arm 32 connected with the chariot. The rotary movement may be obtained by means of a belt running over the pulley 33 or by any other known mechanical means.

On the other hand, the channels 14 in which pass the nuts to be cracked are fed with the nuts by a stationary hopper 34 placed at the highest point. The introduction of the nuts is ensured by the alternative movement of the angle plates 36 connected with the platforms 1 and having finger pieces 35. These angle plates penetrate into the interior of the hopper 34 and consequently into the mass of nuts.

In this assembly, the cracking of the nuts is effected in the following manner: The nuts contained in the hopper 34 penetrate into the channels 14 and travel towards the free ends by reason of the slope or inclination and the alternative or to and fro movement of the platforms 1 and of their connected parts. In this alternative movement they are taken against the inclined walls formed by the pointed metal sheets 12, travel along these walls and press slightly against the fixed upper wall, then, carried along by the alternative movement, they are subjected to the slight action of the protruding knives 21. These operations are repeated a sufficient number of times, to free a fairly high percentage of the kernels. These latter can also be subjected to the same action of the knives 21 but the nature of their surfaces prevent them from being sufficiently wedged for the knives to damage them. It is during these wedging or pressing operations that the pointed sheets enjoy a primordinate function. In spite of this the kernels would finally break up if the action of the knives was repeated too often. For this reason the channels 21 have a limited length.

2. *Sorting.*—The cracking operation such as above described enables the nuts to be treated just as received in bulk conditions. But as this cracking operation is not complete after one passage of the nuts through the machine it is necessary to extract progressively or step by step the nuts which have been insufficiently treated notwithstanding their size which may be smaller than that of some of the kernels.

For this purpose the product whether completely cracked or not, issuing from the channels 14 is directed by means of inclined surfaces 37 into an inclined chamber 38 which receives an alternative movement obtained by the connection of an arm 39 secured to the chariot 4 and the cross members 40. The other end of the chamber 38 may be supported by two small connecting rods 41 secured to the frame for the whole apparatus, which is not illustrated.

The product brought to the chamber 38 is subjected to the action of three different superposed sieves: the first 43 consisting of a perforated metal sheet with round holes which allows all the kernels to pass; a string frame or the like 44 disposed near the lowest part of the sieve retains above it a certain thickness of material or goods which has for effect to separate by difference in density, the kernels from the unbroken shells and from the broken shell. The kernels come in contact with the sieve while the rest floats or remains above.

The output from the sieve 43 being proportionate to that of the channels which feed it, it follows that the unbroken nuts which have sufficiently small dimensions to pass with the kernels are nevertheless inconvenienced by contact with these latter and the greater part is delivered with the goods which remained above, over the frame 44 whence they are delivered into a conduit 45.

The products which have passed through the sieve 43 fall onto a second sieve placed beneath the former. This material which consists of the whole of the kernels with which may be a few unbroken shells and fragments of broken shell is then subjected to the action of the second sieve which consists of a metal sheeting 46 (Figs. 7–8) perforated with round holes 47 of the same dimensions as those of the sieve 43, but grouped in rings each having beneath it a solid circular screen 48 held by a central cross member 49, at a distance from the under face of the sieve 49 equal to the diameter of the holes 47.

String frames or the like 50 ensure, as previously, the separation by density. Further the screens 48 permit the passage of the round kernels or nuts but prevent the passage of unbroken nuts by reason of the elongated form thereof.

The material thrown out or rejected by the second sieve 46 over the frame 50 consists almost entirely of unbroken shells which had managed to pass through the first sieve 43. This rejected material mixes with that from the first sieve which has passed through a conduit 45, by passing through a conduit 51 whence the whole is taken to a first compartment 52 of a stationary vertical conduit through which passes air from bottom or top by reason of a fan 53 which drives off all the shell.

The nuts which have not been broken and freed from the shells are collected at the bottom of the suction or air conduit whence they are taken afresh to the hopper for feeding the channels 14.

The kernels which have passed through the second sieve 46 are subjected to the action of a third sieve 54 (Fig. 4) with elongated holes which free them from dust and fragments of shell which are smaller than the smallest nut. The latter are delivered in front of the chamber into a conduit 55 which directs them towards a second compartment 56 of the vertical air suction conduit 53 where the cleaning is completed. The kernels or nuts so cleaned are collected in the bottom of the conduit 56.

On the other hand the fragments of shell and dust which have fallen into the bottom of the chamber after having passed through the third screen 54, are ejected through a conduit 57.

It results from this arrangement that: the air from the fan 53 travels according to the arrows 58 and throws the shells outside while the imperfectly broken nut shells fall in the direction indicated by the arrow 59 and the whole sorted nuts follow the arrow, 60.

The machine so constructed actuated by a rapid alternative movement can produce by reason of the great inertia of the parts, vibrations which would be unsuitable in practice and particularly for transportable machines. To overcome this objection this machine comprises two identical parts which are symmetrical in relation to the axis X—Y and whose action is intimately connected by means of two gears 61 having the same number of teeth and fast in such a manner that the movable chariots 4 move apart and approach one another at the same time, the dead centres being passed at the same time.

I claim:—

1. A machine for decorticating and sorting nuts comprising a hopper for receiving the nuts to be decorticated, a stationary platform, knives carried by and depending from said stationary platform, a movable platform animated with a rapid alternative movement of short strokes, the surface of said platform spaced from said stationary platform in cooperative relation therewith and including a substantially flat member extending transversely of the movable platform with a triangular shaped member extending upwardly from said flat member at either longitudinal edge thereof for cooperative action with said depending knives, a receptacle, means for conveying the nuts to said receptacle, said receptacle being agitated, a plurality of superposed sieves in said receptacle, each sieve being of different mesh for separating the shells from the kernels, means for retaining on the upper sieve undecorticated nuts and means for returning said undecorticated nuts to said hopper.

2. A machine for decorticating and sorting earth nuts comprising a hopper for receiving the nuts, a stationary platform, knives carried by said stationary platform, said knives depending from said stationary platform a movable platform mounted beneath said stationary platform, said movable platform being animated with a rapid reciprocating movement of short strokes, a plurality of parallel bars secured to said movable platform, a plurality of triangular members located between said bars, channels for the nuts under treatment between said triangular members, means for retaining said triangular members in position, an agitated receptacle, means for conveying the material to said receptacle, said receptacle being angularly disposed, a plurality of sieves mounted in said receptacle, said sieves being of different mesh, said sieves dividing said receptacles into compartments, means for the discharge of material from the middle compartments, means for discharge of material from the lowest compartment and means for conveying material from the top compartment to said hopper.

3. A machine for skinning and sorting earth nuts comprising a hopper into which the nuts are fed, a stationary platform located beneath said hopper, knives carried by and depending from said stationary platform, a movable platform mounted beneath said stationary platform said movable platform being animated with a rapid alternative movement of short strokes, a plurality of dovetail rods secured to the movable platform, a plurality of angle plates mounted between said rods, pointed metal sheets covering said angle plates, corrugated steel members for retaining said angle plates in position, channels between said angle plates communicating with said hopper for the passage of the nuts under treatment, the surface of the movable platform being spaced from the stationary platform in cooperative relation therewith, an agitated receptacle, the nut channels communicating with said receptacle, a plurality of superposed sieves in said receptacle, discharge orifices for sorted material carried by said receptacle and means for returning unskinned nuts to the hopper for further treatment.

4. A machine for decorticating and sorting earth nuts comprising a hopper into which the nuts are fed, a stationary platform located beneath said hopper, knives carried by and depending from said stationary platform, a movable platform mounted beneath said stationary platform and spaced therefrom, said movable platform being animated with a rapid alternative movement of short strokes, a plurality of dovetail rods secured to said stationary platform, a plurality of angle plates mounted between said dovetail rods, perforated metal sheets covering said angle plates, means for retaining said angle plates in position, channels communicating with said hopper disposed between said angle plates for the passage of the nuts under treatment the surface of said movable platform being spaced from the stationary platform in cooperative relation therewith, the nut channels communicating with a receptacle, said receptacle being animated, a plurality of superposed sieves mounted in said receptacle each sieve being of different mesh, a chamber below each sieve, a discharge orifice from each chamber for skinned nuts, a pipe connected with said receptacle and communicating with said hopper for returning uncracked nuts thereto, and a blower connected with said pipe for producing a suction therein.

5. A machine for decorticating and sorting earth nuts comprising a hopper into which the nuts are fed, a stationary platform mounted beneath said hopper, knives carried by and depending from said stationary platform, a movable platform mounted beneath said stationary platform said movable platform being in spaced relation to said stationary platform said movable platform being aminated with a rapid reciprocating movement of short strokes, a plurality of dovetail members, a plurality of triangular members disposed between said dovetail members, said triangular members being covered by perforated metal, a corrugated member for retaining in position said triangular members, channels between said triangular members, means for conveying the nuts to said channels, an agitated receptacle, means for conveying the material under treatment to said receptacle, a plurality of sieves mounted in said receptacle for sorting the nuts, the undecorticated nuts being retained by the upper sieve, means for the outlet of the decorticated nuts and means for returning the undecorticated nuts to the hopper.

BAPTISTIN BRANDA.